UNITED STATES PATENT OFFICE.

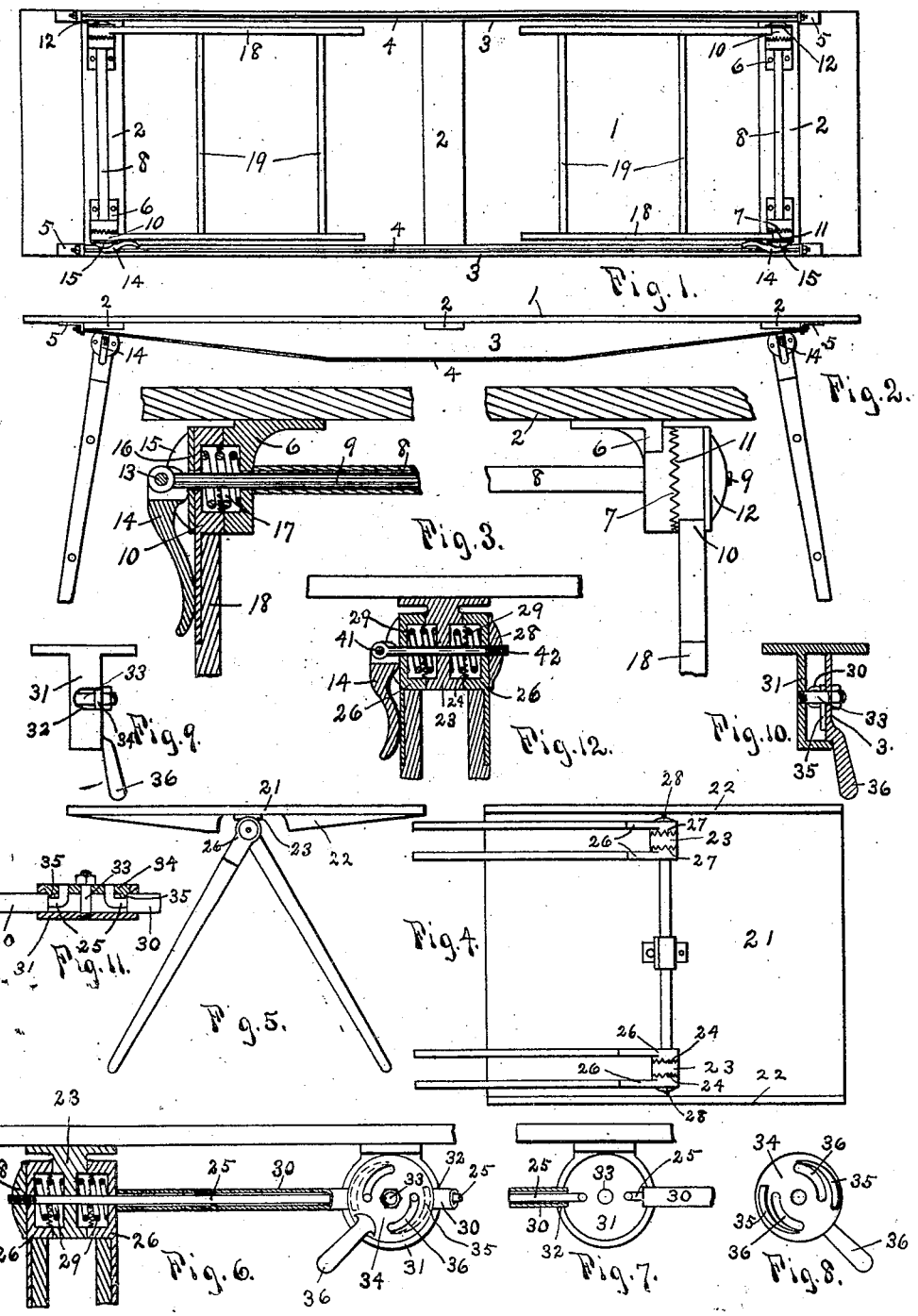

CHARLES R. SHELDON, OF PORT HURON, MICHIGAN.

COLLAPSIBLE TABLE.

No. 816,258.        Specification of Letters Patent.        Patented March 27, 1906.

Application filed December 12, 1904. Serial No. 236,445.

*To all whom it may concern:*

Be it known that I, CHARLES R. SHELDON, a citizen of the United States, and a resident of Port Huron, in the county of St. Clair and State of Michigan, have invented a new and Improved Collapsible Table, of which the following is a specification.

My invention relates to that class of tables in which the legs can be folded up against the top; and the objects of my improvements are to provide a table of this kind in which the legs may be freely moved to any desired position and there locked in position, to provide a table of this kind in which all the legs may be locked at any desired angle by the movement of a single handle, and to provide joints for table-legs that shall be strong, simple, easily locked, and unlocked. I attain these objects by the construction illustrated in the accompanying drawings, in which—

Figure 1 is a plan and Fig. 2 is a side view of a table especially adapted for paper-hangers, which table is provided with my improved folding legs. Fig. 3 is an enlarged detail of the locking means. Fig. 4 is a plan and Fig. 5 is a side view of a table in which all the pivots of the four legs have the same central line. Figs. 6 to 11, inclusive, are details of the locking means. Fig. 12 is a modified form of this lock.

Similar reference characters refer to like parts throughout the several views.

Collapsible tables are of great utility because of the ease with which they may be moved from place to place and on account of the small space they occupy when folded up; but the satisfactory table of this kind must be so constructed that the legs may be set at any angle, so that the height of the table may be varied, and the joints of the legs should be as strong and permanent as the legs themselves.

In Figs. 1, 2, and 3 I have shown a light strong long narrow table, which has a top 1, to the under side of which are secured the cross-pieces 2. Side pieces 3 along the edges of the top extend from one outer cross-piece to the other. Light steel rods 4 extend along the lower edges of these side pieces, their screw-threaded ends passing through the angle-irons 5, which bear against the outer cross-pieces. By tightening the nuts on the ends of these rods they, together with the side pieces 3, form trusses which give the table-top great rigidity and strength.

Secured to the outer cross-pieces are the brackets 6, which are provided with rings of radial teeth 7. The tube 8 extends between each pair of brackets and holds them the correct distance apart. A rod 9 extends through this tube and the brackets, and on it near its ends are journaled the plates 10, each provided with a ring of radial teeth 11. One end of this rod is screw-threaded, and on it is screwed the washer 12. The other end is in the form of an eye, through which passes the pin 13, on which is pivoted the cam-lever 14. This lever lies between two jaws 15 on one of the plates 10 or on a washer 16, secured to the plate. In the depression between the rings of teeth of the plates and their respective brackets are springs 17, which tend to force the teeth apart. The legs 18 are secured to the plates 10 and are connected by rounds 19, the distance between the upper rounds and the rings of teeth being sufficient to permit the legs to spring out sufficiently to disengage the teeth. The throw of the cam-lever is greater than twice the depth of the teeth. The washer 12 can be screwed on or off for the purpose of adjustment. By swinging the cam-lever out at right angles the springs are permitted to force the rings of teeth out of engagement, so that the legs may be positioned at the desired angle. The lever is then brought to the position shown in the figures, when all the parts will be locked.

For small tables that are nearly equal in length and width and for drafting-boards it is often desirable that the legs be secured at or near the middle of the top. In the modification shown in Figs. 4 to 11, inclusive, 21 is the top, provided with the strengthening side pieces 22. Two brackets 23, provided with rings or teeth 24 on both sides, are secured to the table-top. Rods 25 extend from near the center through the brackets, and on them are journaled the plates 26, having rings of teeth 27. On the outer ends of the rods are secured the screw-threaded washers 28 for the purpose of adjustment. After adjustment the ends of the rods may be riveted to prevent the washers from turning on the rods. This is unnecessary on the table of Figs. 1 to 3, as there the rod always turns with the legs. Springs 29 are placed in the depressions between the rings of teeth to force them apart. Each rod is intended to pull its respective plate and ring of teeth into engagement with the outer ring of teeth of its bracket. Each of the inner plates and its ring of teeth is forced into engagement with the inner ring of teeth of its bracket by the short tubes 30, that are mounted on the rods 25. The mechanism to pull the rods 25 inward and to push the tubes outward is as follows:

Secured to the center of the table is a cylindrical box 31, having notches 32 in the sides through which the tubes enter. Mounted on the stud 33 in the center of the box is a cam-disk 34, provided with inwardly-projecting cam-strips 35 and cam-slots 36. (See Fig. 8.) The inner ends of the rods 25 are bent so as to enter these slots, Fig. 11, and the inner ends of the tubes engage the strips 35. The eccentricity of the slots and strips are opposite—that is, upon turning the disk the rods are pulled in and the tubes pushed out, or the tubes are permitted to be pushed in and the rods pulled out by the springs, according to the direction the disk is turned. In the cross-sections of Figs. 10 and 11 the depth of these cam-strips is shown, while in the bottom view of the disk, Fig. 8, the eccentricity of the strips and slots is brought out. In Fig. 6 the handle 36 is shown in the locking position. By swinging it ninety degrees to the right the teeth of the rings would be permitted to disengage. The eccentricity of the slots and strips should be a little more than the depth of the teeth to insure free movement of the legs.

Instead of the mechanism just described the pairs of legs on each side may be locked by the mechanism shown in Fig. 12. The central brackets 23, rings of teeth 24, plates 26, springs 29, and washers 28 are similar to those just described. The cam-lever 14 of Figs. 1 to 3 is hung on the pin 41 in the eye on the end of the rod 42, passing through the plates and bracket. The operation is apparent.

It is readily apparent that not only can this table be locked at any desired angle, but the top may be tilted as desired. This makes a table of this kind adaptable for use as an easel or drawing-board. The farther the legs are spread the less the height of the table, while to remove the legs entirely it is only necessary to unscrew the washers 12 and 28 and the cam-disk 34.

Having now explained my improvement, what I claim as my invention, and desire to secure by Letters Patent, is—

1. In a collapsible table, the combination of a top, brackets secured to said top and each provided with rings of radial teeth on both sides, rods passing through said brackets, plates pivoted on said rods on both sides of said brackets and provided with rings of teeth adapted to engage those of the brackets, a supporting-frame, tubes mounted on said rods and extending from said brackets and plates to enter said frame, a cam-disk mounted in said frame and provided with cam strips and slots, the strips being adapted to force the tubes outward to engage the teeth of the inner plates with the inner rings of teeth on said brackets, the inner ends of said rods being adapted to enter said cam-slots so that said cam may pull the teeth of the outer plates into engagement with the outer rings of teeth on the brackets, springs to force the rings of teeth apart, and table-legs secured to each of said plates.

2. In a collapsible table, the combination of a top, brackets secured to said top, each provided with two rings of radial teeth, a rod passing through each bracket, plates journaled on said rod on both sides of said brackets and provided with rings of teeth adapted to engage the teeth of the brackets, springs mounted on said rod and adapted to force said rings of teeth out of engagement, a cam engaging one end of said rod to force said teeth into engagement, adjusting means mounted on the other end of said rod, and a table-leg carried by each plate.

3. In a collapsible table, the combination of a top, brackets secured to said top each provided with two rings of radial teeth, a rod passing through each bracket, plates journaled on said rod on both sides of said brackets and provided with rings of teeth adapted to engage the teeth of the brackets, springs mounted on said rod and adapted to force said rings of teeth out of engagement, a cam engaging one end of said rod adapted in connection with a stop on the other end of said rod to force said teeth into engagement, and a table-leg carried by each plate.

4. The combination of a frame, brackets secured thereto and provided with radial teeth, a rod passing through each bracket, plates journaled on said rod and provided with rings of teeth adapted to engage the teeth on the brackets, springs mounted on said rod and adapted to force said rings of teeth out of engagement, and a cam engaging one end of said rod and adapted to force said teeth into engagement with each other, adjusting means mounted on the other end of said rod, and a table-leg carried by each plate.

In testimony whereof I have signed my name to this specification in the presence of two subscribing witnesses.

CHARLES R. SHELDON.

Witnesses:
W. F. DAVIDSON,
F. G. McNUTT.